United States Patent [19]

Dreher et al.

[11] 4,221,229

[45] Sep. 9, 1980

[54] RETRO-VISCOUS FLUIDIC FLUID

[75] Inventors: Karl D. Dreher; William B. Gogarty, both of Littleton, Colo.

[73] Assignee: Marathon Oil Company, Findlay, Ohio

[21] Appl. No.: 665,661

[22] Filed: Mar. 10, 1976

[51] Int. Cl.$^2$ ............................................. C01M 1/40
[52] U.S. Cl. .................... 137/13; 252/33.3; 137/807
[58] Field of Search ............................ 137/1, 13, 807; 252/308, 309, 312, 71

[56] References Cited

U.S. PATENT DOCUMENTS

| | | | |
|---|---|---|---|
| 2,417,850 | 3/1947 | Winslow | 252/64 X |
| 2,661,596 | 12/1953 | Winslow | 192/21.5 X |
| 3,416,549 | 12/1968 | Chaney | 137/807 |
| 3,548,852 | 12/1970 | Fisher | 137/807 |

Primary Examiner—Alan Cohan
Attorney, Agent, or Firm—Jack L. Hummel

[57] ABSTRACT

A fluidic fluid composition containing lamellar micelles and which exhibits retro-viscous properties at noncryogenic temperatures is composed of 7.00–7.35% of a surfactant (preferably petroleum sulfonate having an average equivalent weight of 350–525), 50.00–54.00% of liquid hydrocarbon, 24.80–28.00% of water and optionally up to 13.00–13.95% of a cosurfactant (preferably an alcohol containing 1–20 carbon atoms) and/or electrolyte (preferably inorganic salt). The micelles within the composition must have an axial ratio of at least 3.5. The composition is substantially optically clear, phase stable, birefrigent, and the flow properties are such that substantially large increases in flow rates, e.g. 20-fold, can be realized at very small pressure increases, e.g. 5%. Additional additives to impart desired properties can be included with the composition.

14 Claims, 3 Drawing Figures

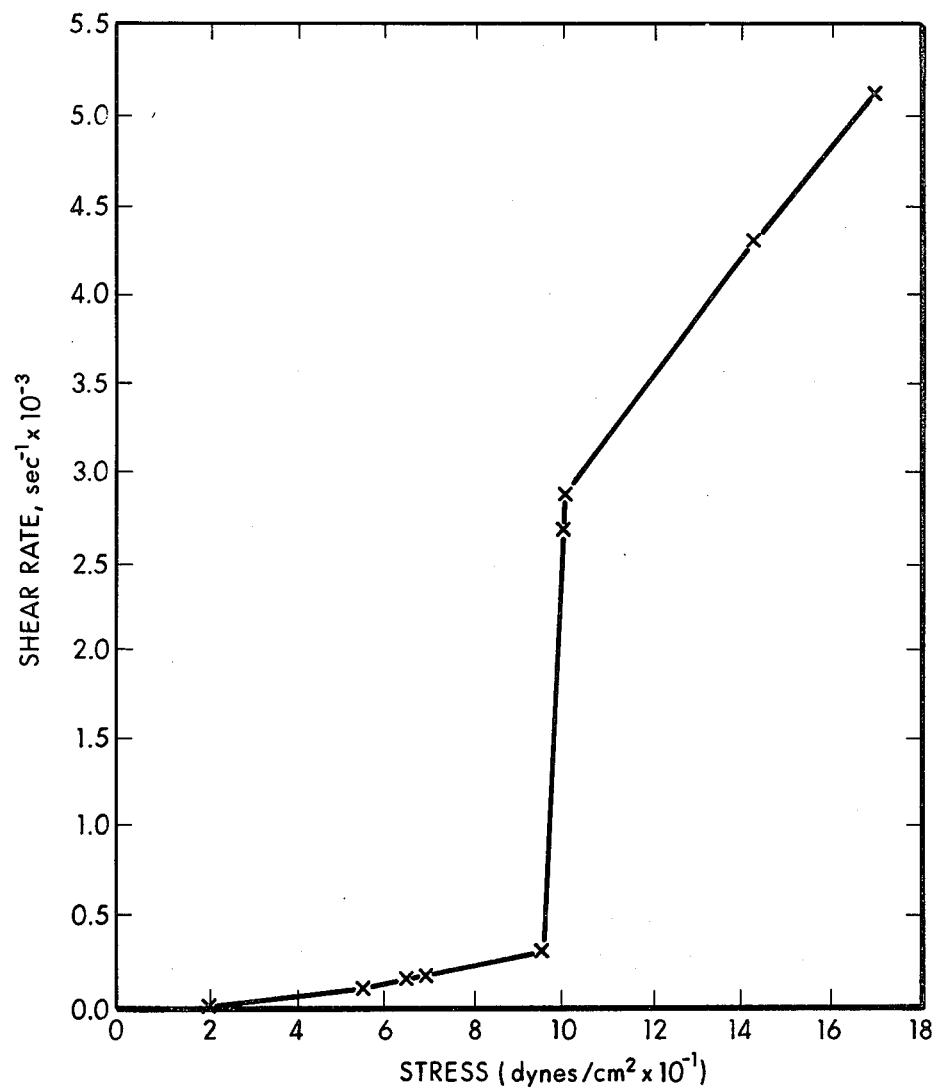
Fig. 1 SHEAR RATE vs SHEAR STRESS

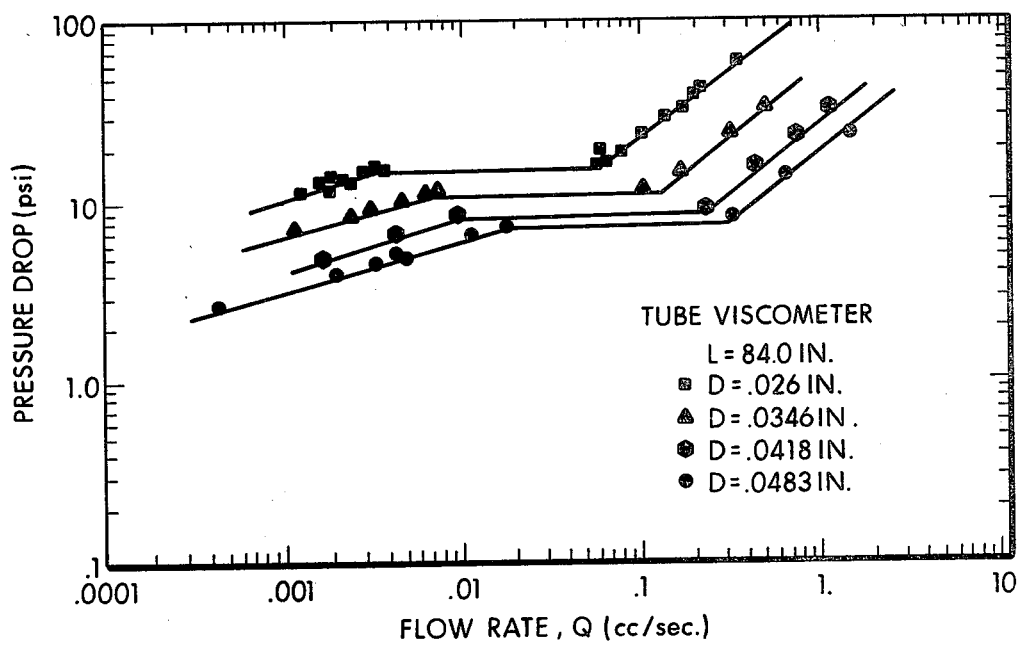
Fig. 2 PRESSURE DROP vs FLOW RATE CURVE
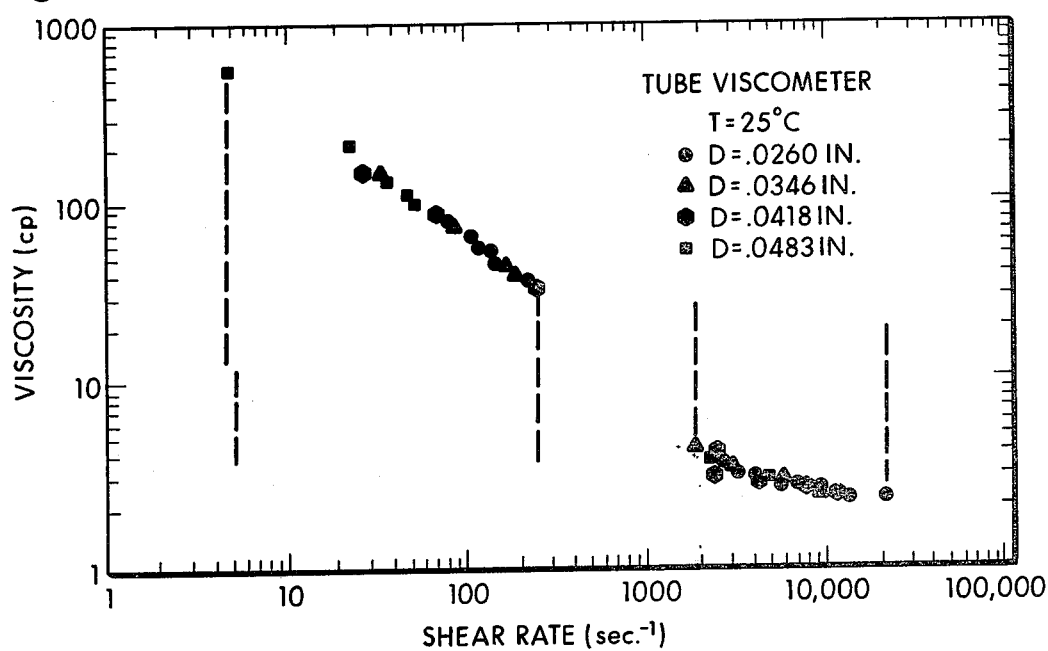
Fig. 3 APPARENT VISCOSITY vs SHEAR RATE CURVE

RETRO-VISCOUS FLUIDIC FLUID

BACKGROUND OF THE INVENTION

1. Field of the Invention

This invention relates to fluidic fluids containing water, surfactant, hydrocarbon, and optionally cosurfactant and/or electrolyte. Lamellar micelles are present in the composition.

2. Description of the Prior Art

The art of fluidics uses the flow analog of electricity to develop fluid systems analogous to those used in electronics. That is, pressure drop is made analogous to electrical potential, flow rate is made analogous to current, and viscosity of the fluid becomes analogous to the resistance in the electrical circuit. Such systems are frequently referred to as fluid amplifiers, counters, etc. For example, U.S. Pat. Nos. 3,327,726 and 3,451,409 teach devices wherein a fluid power stream is controlled by one or more jets having lower pressures than the power stream. The power streams may be deflected towards and away from a receiver port to provide pressure changes therein substantially greater than the control jet pressure, hence the term fluid amplifier. By and large the art has employed air and other gases to obtain rapid pressure variations to perform control functions by inexpensive components with little or no use of electrical or electronic elements. Such systems have the capability of operating in temperature conditions which cannot be tolerated by electronic components.

Another advantage of fluidic controls is a high level of reliability over a long life attributable, to a large measure, to the lack of mechanical moving parts. This potential has been difficult to fully realize in many instances, particularly where air has been employed as the motive fluid. Over a period of time it has been found that the fluid amplifier characteristics and to change so that, for example, a fluidic control circuit having a counting function will fail to count all of the input pulses thereto. On the other hand, the use of liquid motive fluids, in such fluidic systems has not proved advantageous chiefly due to the high viscosity of liquids relative to those of gases.

Applicants have discovered the use of novel fluidic fluid compositions which have the properties of both high and low fluidity. That is, under some conditions of flow, the liquid will behave as a gas, i.e., the composition appears to have no resistance to flow while, under other conditions, the liquid will behave as a viscous liquid. In the gaseous regions, the liquid viscosity will be very low, while in the liquid regions, a high viscosity will be experienced. This phenomenon will hereinafter be referred to as retro-viscous behavior. The existence of such behavior in a fluid suggests many applications of the flow analog of electricity to fluidic systems. For example, the retro-viscous property can be used in fluidics to create fluid devices whose operating characteristics are analogous to those electrical devices whose current-voltage curves are characterized by one or more breakover voltages such as those for the silicon controlled rectifiers taught by the RCA Transistor, Thyristor & Diode Manual. That is to say substantially large increases in flow rates can be realized at very small pressure increases and vice versa.

This retro-viscous behavior is exhibited by micellar systems whose micelles generally have axial ratios of at least 3.5. Micelles are well known in the art. Both oil-external and water-external micellar dispersions (this term includes microemulsions, micellar solutions, etc.) are taught in U.S. Pat. Nos. 3,254,714, to Gogarty et al; 3,497,006 to Jones et al; 3,506,070 and 3,507,071 to Jones. These dispersions generally exhibit a decrease in viscosity upon increase in flow rate.

SUMMARY OF THE INVENTION

Applicant's fluidic fluid composition exhibits a very large increase in flow rate under a very small pressure increase. The lamellar micelles within the composition have a preferred axial ratio of at least 10. The composition contains about 7.00–7.35% surfactant, 50.00–54.00% liquid hydrocarbon, 24.80–28.00% water, and up to 13.95% cosurfactant and/or up to 5% by weight, based on the water, of electrolyte, e.g. inorganic salt. Additives such as oxidation inhibitors may be incorporated within the composition.

DESCRIPTION OF THE DRAWINGS

In FIG. 1, the shear rate is plotted vs. the shear stress from Example 2 data. Up to a shear stress of about 9.5 dynes/cm$^2 \times 10^1$ and after a shear stress of about 10 dynes/cm$^2 \times 10^1$, the particular composition of this invention acts as a pseudo plastic fluid. Between these shear stresses is the unique retro-viscous property of the invention, i.e., the composition appears to have no resistance to flow at these shear stresses but at lower and higher shear stresses the composition appears viscous.

FIG. 2 shows the relation of pressure drop to flow rates in different size tubes. The tubes are made of stainless steel, are 84" and have diameters as indicated in FIG. 2. Data for this figure are obtained by titrating with distilled water an anhydrous composition containing 9.8% ammonium heptadecylbenzene sulfonate, 18.5% cyclohexanol, and 71.8% n-decane, the percents based on weight. On initial titration it is postulated that spherical micelles are obtained. Further titration results in lamellar micelles, at which time the pressure drop vs. flow rate exhibits a flat response. It is postulated that additional titration obtains substantially spherical micelles. The compositions containing the substantially spherical micelles act as Newtonian fluids.

FIG. 3 represents the relationship of viscosity vs. shear rate in the tubes identified in FIG. 2 for the composition identified above. These data obtained at 25° C. The discontinuity of the graph in this Figure is characteristic of the retro-viscous compositions of this invention.

DESCRIPTION OF PREFERRED EMBODIMENTS OF INVENTION

The compositions of this invention contain lamellar micelles which have an axial ratio (ratio of length divided by diameter) of at least 3.5 and preferably at least 10 and more preferably at least 20. The compositions are optically clear, phase stable, and exhibit birefringence. Colored impurities in the composition may, however, render the compositions opaque or translucent. They generally have a viscosity of at least 75 cps at a shear rate of 10 sec$^{-1}$ at 23° C. When these compositions are under flowing conditions and at particular pressures an increase in pressure, e.g. up to 5%, will effect a substantially large increase in flow rate, e.g. 20-fold increase. These compositions are like liquid crystals in that they exhibit birefringence. Also, the compositions have an elastic component which increases with shear rate, i.e. the faster one shears the composition, the more energy is stored in the composition.

The compositions contain water, surfactant, hydrocarbon, and optionally cosurfactant and/or electrolyte.

The surfactant is present in concentrations of about 7.00 to about 7.35%, preferably about 7.15 to about 7.30% and more preferably about 7.18 to about 7.20%. Carboxylates and sulfonates are useful as the surfactant. Preferably the surfactant is a sulfonate, more preferably an alkaryl sulfonate (includes petroleum sulfonates) and has an average equivalent weight within the range of about 350 to about 525, preferably about 375 to about 500 and more preferably about 400 to about 470. Mono and/or polysulfonates are useful. Examples of such sulfonates include alkaryl sulfonate wherein the alkyl group contains about 6 to about 20 carbon atoms and preferably about 10 to about 17 carbon atoms, e.g. ammonium heptadecylbenzene sulfonate. Cation of the sulfonate is an alkali metal or ammonium.

Useful carboxylates are preferably the monovalent cation and ammonium salts of fatty acids; they preferably have average equivalent weights within the range of about 200 to about 500 and preferably about 250 to about 400 and more preferably about 300 to about 375. Specific examples include the salts of the following acids: aliphatic acids such as capric, lauric, myristic, palmitic and stearic; aromatic acids such as substituted benzoic, naphthoic, substituted naphthoic and similar aromatic acids; and in general saturated fatty acids and substituted products thereof and unsaturated fatty acids and substituted products thereof. Average equivalent weight is defined as the average molecular weight divided by the average number of carboxylate or sulfonate groupings per molecule. Thus, the equivalent weight of a sulfonate is equal to the molecular weight when the sulfonate is a mono sulfonate.

The hydrocarbon is present in concentrations of about 50.00 to about 54.00, preferably about 52.40 to about 53.80 and more preferably about 52.50 to about 52.90. The hydrocarbon can be crude oil (preferably sweet crude), partially refined fractions of a crude oil such as gasoline, kerosene, naphtha, liquefied petroleum gases, and other distillation cuts from fractionation of crude oil. Refined fractions of crude oil are also useful, such as jet fuel, "finished gasoline," benzene, toluene, xylene, propylene, butylene, etc. Also, the hydrocarbon can be a synthesized hydrocarbon including substituted paraffinic and aromatic hydrocarbons as well as halogenated hydrocarbons. Unsulfonated hydrocarbon within the petroleum sulfonates is also useful.

The water can be soft water, brackish water, or a brine. Concentration of the water is about 24.80 to about 28.00%, preferably about 25.00 to about 27.00% and more preferably about 26.20 to about 26.70%. If ions are present in the water, they are preferably compatible with the surfactant as well as other components within the composition.

The cosurfactant can be an alcohol, ester, aldehyde, ketone, ether, or a compound containing one or more of hydroxy, oxy, epoxy, amino, chloro, bromo or like groups. The cosurfactant contains 1 to about 20 more and preferably about 3 to about 16 carbon atoms. Examples include isopropanol, n- and i-butanols, amyl alcohols, such as n-amyl alcohol, 1- and 2-hexanol, cyclohexanol, 1-octanol, decyl alcohols, alkaryl alcohols such as p-nonyl phenol, glycol monobutyl ether (butyl Cellusolve), diethylene glycol monobutyl ether (butyl Carbitol), ethoxylated alcohols and alcoholic liquors such as fusel oil. The preferred cosurfactant is an aliphatic alcohol(s) including primary, secondary and/or tertiary alcohols. The cosurfactant is present in concentrations of up to about 13.95% and preferably about 13.50 to about 13.90% and more preferably about 13.56 to about 13.60%.

The electrolyte is present in concentrations up to about 5% and preferably about 0.001 to about 3% and more preferably about 0.01 to about 2.5%, based on the water. The electrolyte is an inorganic salt, inorganic base, inorganic acid or combination thereof. Specific examples include sodium hydroxide, sodium chloride, sodium sulfate, sodium nitrate, hydrochloric acid, sulfuric acid, ammonium chloride, ammonium hydroxide, ammonium sulfate, potassium choride, etc. Other examples of electrolytes are taught in U.S. Pat. No. 3,330,343 to Tosch et al.

The addition of the electrolyte generally broadens the retro-viscous range of the composition. Retro-viscous behavior is the property of the composition to exhibit essentially negligible pressure drop at increased flow rates. This means that the mixture can exhibit extremely low viscosity over a certain range of shear rates. That is, essentially no increase in pressure drop is required to increase the flow rate of the composition—see FIG. 2. Broadening out the retro-viscous range may be desired where the composition comes in contact with fluids which adversely influence this property. That is, by starting with a broad retro-viscous range, the composition will be compatible over a wider range of fluid operating conditions before it degrades, and no longer exhibits behavior analogous to a breakover voltage.

The compositions of this invention are made up of lamellar micelles which can be viewed as alternating layers of water and hydrocarbon with surfactant between these layers, the polar groups of the surfactant being in the water.

The fluidic fluid can be monitored during use to determine whether the composition needs to be adjusted to maintain the retro-viscous properties. For example, additional components may necessarily be added to obtain these properties or a portion of a component(s) may be extracted to maintain the property. Also, the temperature of the composition can be controlled to maintain desired properties.

Additives can be incorporated into the retro-viscous composition. These additives are those generally known to the art and can generally be qualified as those which do not substantially exert an adverse influence upon the retro-viscous properties of the composition. A small amount of experimentation may be necessary to determine preferred concentrations, etc. and the preferred additives which will work best. Examples of additives useful with the composition include bactericides, viscosity-increasing agents (either hydrophilic or oleophilic), anti-friction agents, anti-welding agents, anti-foaming agents, etc. The following examples are representative of the compositions. Unless otherwise specified, all percents are based on weight.

EXAMPLE 1

To illustrate the criticality of the viscosity, the water concentration, etc., the following eight examples are presented. These samples are composed of identical components and are admixed under identical conditions:

TABLE 1

| | SAMPLE NUMBERS (% BY WEIGHT) | | | | | | | |
|---|---|---|---|---|---|---|---|---|
| | 1 | 2 | 3 | 4 | 5 | 6 | 7 | 8 |
| NH$_4$-heptadecyl-Benzene sulfonate | 9.0 | 7.7 | 7.4 | 7.3 | 7.2 | 7.15 | 6.1 | 7.18 |
| Cyclohexanol | 16.9 | 14.5 | 14.0 | 13.9 | 13.6 | 13.5 | 11.5 | 13.56 |
| n-Decane | 65.7 | 56.4 | 54.2 | 53.8 | 52.9 | 52.4 | 44.7 | 52.5 |
| Distilled Water | 8.3 | 21.4 | 24.3 | 25.0 | 26.2 | 27.0 | 37.6 | 26.7 |
| Viscosity (cp) at shear rate of 10 sec$^{-1}$ and 23° C. | 3.6 | 5.7 | 6.3 | 82.0 | 118.0 | 350.0 | 50.0 | 200.0 |

Of the above eight samples, only samples 4, 5, 6 and 8 are compositions of this invention in that they exhibit retro-viscous properties, i.e. essentially zero viscosity over particular shear rates, whereas samples 1, 2, 3 and 7 do not.

EXAMPLE 2

Sample 6 from Example 1 is studied. Pressure drop vs. flow rate is studied in a stainless steel tube having a diameter of 0.2646" and a length of 132.38".

TABLE II

TUBE VISCOMETER

| ΔP (psi) | Q (cc/sec) |
|---|---|
| 13.45 | 0.0010 |
| 14.12 | 0.0011 |
| 16.60 | 0.0016 |
| 16.74 | 0.0016 |
| 16.74 | 0.0018 |
| 18.15 | 0.0391 |
| 23.20 | 0.0551 |
| 29.54 | 0.0806 |
| 32.46 | 0.0909 |
| 42.00 | 0.1400 |
| 59.00 | 0.2010 |
| 80.00 | 0.3100 |
| 97.00 | 0.3730 |

From the above data, it is evident that for a pressure increase of between 16.74 to 18.15 psi, the flow rate increases by more than one order of magnitude. This means that essentially no increase in pressure is required to increase the flow of the mixture by more than 10-fold. Within this flow rate range, the viscosity is essentially that of gas.

EXAMPLE 3

Additional samples of compositions obtained with sodium petroleum sulfonate are proposed in Table III:

TABLE III

| | 9 | 10 | 11 |
|---|---|---|---|
| | % | % | % |
| Shell sulfonate | 7.00 | 7.10 | 7.35 |
| n-Decane | 54.00 | 52.00 | 50.00 |
| Distilled Water | 25.05 | 27.00 | 28.00 |
| Isopropanol | 13.95 | — | 13.00 |

The Shell sulfonate has an average equivalent weight of about 470 and is a monosulfonate. Activity of the Shell sulfonate in Samples 10 and 11 is 62%, e.g. Sample 10 contains 7.44% active sulfonate, the residue is salts and unreacted hydrocarbon, and the activity in Sample 9 is 100%. The example also verifies the applicant's finding that although the cosurfactant is not essential for the production of lamellar micelles, and hence for exhibition of retro-viscous behavior, the presence of the appropriate cosurfactant is preferred.

These data are obtained as a function of titrating a stock solution of NH$_4$-heptadecylbenzene-p-sulfonate cyclohexanol and n-decane with distilled water. These data suggest that as the water is added, an inversion from an oil-external system to a water-external system occurs. Although all eight samples are optically clear, only samples 14, 15, 16, 17, and 18 exhibit birefringence as evidenced by the depolarization of incident light (these data are obtained with a Brice-Phoenix light scattering photometer) and samples 12, 13 and 19 show no birefringence. The viscosity data and depolarization measurements suggest that as water is added to the system, small spherical water droplets suspended in decane (note the specific conductivity of sample 12) change to lamellar structures. Such a change can be considered as alternating layers of water and decane with the sulfonate and cyclohexanol oriented between these layers with their polar groups in the aqueous phase. The data for sample 18 suggests complete inversion to small oil droplets suspended in water. Data for these eight samples are illustrated in Table IV.

TABLE IV

FLUID PROPERTIES

| Sample Number | Specific Conductivity (mhos/cm) | Viscosity (cp) | Depolarization (IH/IV) |
|---|---|---|---|
| 12 | $4 \times 10^{-6}$ | 4 | 0 |
| 13 | $1 \times 10^{-3}$ | 8 | 0 |
| 14 | $1.6 \times 10^{-3}$ | 9 | 1.0 |
| 15 | $1.7 \times 10^{-3}$ | 98 | 1.0 |
| 16 | $1.7 \times 10^{-3}$ | 450 | 1.0 |
| 17 | $1.7 \times 10^{-3}$ | 1000 | 1.0 |
| 18 | $1.7 \times 10^{-3}$ | 250 | 1.0 |
| 19 | $3.6 \times 10^{-3}$ | 62 | 0 |

Under specific conductivity, mhos is defined as 1/ohms and cm is centimeter. The viscosity is obtained on a Brookfield viscometer run at 6 rpm at 23° C. IH and IV are defined as intensity of the horizontal component of scattered light from the fluid and intensity of the vertical component of the same light, respectively.

Fluid samples 12 and 13 are oil-external microemulsions whereas sample 17 is a water-external microemulsion and samples 14, 15, 16, 17, and 18 are in the transition stage between an oil-external microemulsion and a water-external microemulsion and are representative of compositions of this invention.

Pressure drop (psi) vs. flow rate (cc/sec) in a tube viscometer having dimensions as indicated in the tables for samples 12, 13, 15, 16, and 19 are plotted in Tables V, VI, VII, VIII and IX ($T_w$=shear stress at the wall of the tube, $\Delta v/\Delta r$=shear rate also at the wall and ua=apparent viscosity):

TABLE V

FLUID 12
TUBE VISCOMETER - L = 213.99 cm, D = 0.066 cm

| ΔP psi | Q cc/sec | $T_w$ dynes/cm | Δv/Δr sec | u a cp |
|---|---|---|---|---|
| 1.60 | 0.00635 | 8.48 | 235 | 3.6 |
| 1.64 | 0.00599 | 8.72 | 222 | 3.9 |
| 8.10 | 0.0437 | 43.0 | 1623 | 2.6 |
| 8.13 | 0.0461 | 43.2 | 1712 | 2.5 |
| 19.16 | 0.1206 | 101.9 | 4477 | 2.3 |
| 19.06 | 0.1246 | 101.4 | 4628 | 2.2 |
| 19.06 | 0.1218 | 101.4 | 4313 | 2.4 |
| 29.4 | 0.1935 | 156.4 | 6852 | 2.3 |
| 52.5 | 0.338 | 279.3 | 11966 | 2.3 |
| 52.0 | 0.330 | 276.6 | 11685 | 2.4 |
| 52.0 | 0.332 | 276.6 | 11753 | 2.4 |
| 71.3 | 0.458 | 379.3 | 16214 | 2.3 |
| 71.3 | 0.454 | 379.3 | 16075 | 2.4 |
| 140.0 | 0.859 | 744.7 | 30415 | 2.4 |
| 140.0 | 0.903 | 744.7 | 31973 | 2.3 |

TABLE VI

FLUID 13
TUBE VISCOMETER - L = 213.99 cm, D = 0.066 cm

| ΔP psi | Q cc/sec | $T_w$ dynes/cm$^2$ | Δv/Δr sec$^{-1}$ | u a cp |
|---|---|---|---|---|
| 5.4 | 0.0215 | 28.7 | 696 | 4.1 |
| 7.1 | 0.0295 | 37.7 | 954 | 3.9 |
| 7.0 | 0.0301 | 37.3 | 973 | 3.8 |
| 9.2 | 0.0400 | 48.9 | 1294 | 3.8 |
| 14.2 | 0.0648 | 75.5 | 2096 | 3.6 |
| 13.5 | 0.0631 | 71.8 | 2041 | 3.5 |
| 13.5 | 0.0610 | 71.8 | 1973 | 3.6 |
| 19.6 | 0.0960 | 104.2 | 3105 | 3.3 |
| 19.3 | 0.0980 | 102.7 | 3170 | 3.2 |
| 19.3 | 0.1024 | 102.7 | 3312 | 3.1 |
| 29.5 | 0.1576 | 156.9 | 5097 | 3.1 |
| 29.5 | 0.1577 | 156.9 | 5100 | 3.1 |
| 43.0 | 0.2488 | 228.7 | 8049 | 2.8 |
| 42.5 | 0.2521 | 226.1 | 8156 | 2.8 |
| 59.0 | 0.3448 | 313.8 | 11152 | 2.8 |
| 58.8 | 0.3450 | 312.8 | 11159 | 2.8 |
| 100.0 | 0.668 | 531.9 | 21609 | 2.5 |
| 100.0 | 0.662 | 531.9 | 21415 | 2.5 |
| 100.0 | 0.671 | 531.9 | 21708 | 2.45 |

TABLE VII

FLUID 16
TUBE VISCOMETER - L = 213.99 cm, D = 0.066 cm

| ΔP psi | Q cc/sec | $T_w$ dynes/cm$^2$ | Δv/Δr sec$^{-1}$ | u a cp |
|---|---|---|---|---|
| 3.9 | 0.000299 | 20.8 | 13.3 | 156.0 |
| 10.5 | 0.00195 | 56.0 | 86.6 | 64.7 |
| 12.2 | 0.00285 | 65.1 | 126.8 | 51.3 |
| 12.8 | 0.00288 | 68.3 | 128.4 | 53.2 |
| 12.8 | 0.00299 | 68.3 | 132.9 | 51.4 |
| 18.0 | 0.00670 | 96.0 | 298.0 | 32.2 |
| 18.8 | 0.0700 | 100.3 | 2663.0 | 3.8 |
| 19.1 | 0.0750 | 101.9 | 2853.0 | 3.6 |
| 26.8 | 0.113 | 143.0 | 4299.0 | 3.3 |
| 31.9 | 0.135 | 170.2 | 5133.0 | 3.3 |
| 41.0 | 0.195 | 218.8 | 7418.0 | 2.9 |
| 73.0 | 0.410 | 389.5 | 15598.0 | 2.5 |

TABLE VIII

FLUID 15
TUBE VISCOMETER - L = 336.24 cm, D = 0.0672 cm

| ΔP psi | Q cc/sec | $T_w$ dynes/cm$^{-2}$ | Δv/Δr sec$^{-1}$ | u a cp |
|---|---|---|---|---|
| 13.45 | 0.00103 | 46.33 | 53.8 | 86.1 |
| 14.12 | 0.00105 | 48.61 | 54.9 | 88.5 |
| 16.60 | 0.00164 | 57.16 | 85.7 | 66.7 |
| 16.74 | 0.0016 | 57.66 | 83.6 | 69.0 |
| 16.74 | 0.0018 | 57.66 | 94.1 | 61.3 |
| 18.46 | 0.0391 | 62.50 | 1393.0 | 4.5 |
| 18.15 | 0.00261 | 63.58 | 136.3 | 46.7 |
| 23.20 | 0.0551 | 79.89 | 1963 | 4.1 |
| 29.54 | 0.0806 | 101.75 | 2872 | 3.5 |
| 32.46 | 0.0909 | 111.81 | 3239 | 3.4 |
| 42.0 | 0.140 | 144.67 | 4989 | 2.9 |
| 59.0 | 0.201 | 203.23 | 7163 | 2.8 |
| 80.0 | 0.310 | 275.55 | 11048 | 2.5 |
| 97.0 | 0.373 | 334.11 | 13292 | 2.5 |

TABLE IX

FLUID 19
TUBE VISCOMETER - L = 213.36 cm, D = 0.066 cm

| ΔP psi | Q cc/sec | $T_w$ dynes/cm$^{-2}$ | Δv/Δr sec$^{-1}$ | u a cp |
|---|---|---|---|---|
| 11.7 | 0.00354 | 62.4 | 126.8 | 49 |
| 17.0 | 0.0052 | 90.7 | 186.2 | 49 |
| 38.8 | 0.01245 | 207.0 | 446.0 | 46 |
| 65.0 | 0.0214 | 346.7 | 766.5 | 45 |
| 98.5 | 0.0333 | 525.5 | 1192.7 | 44 |

Samples 15 and 16, for example, are quite unique. Sample 16 has a structural rearrangement within the fluid up to a shear rate of 300 sec$^{-1}$ at which time the fluid collapses and offers essentially no resistance to flow until the shear rate reaches 2,600 sec$^{-1}$ at which time the fluid reverts to a non-Newtonian flow characteristic. Sample 15 behaves the same way, except the collapse occurs at a shear rate of 135 sec$^{-1}$ and does not recover until 1400 sec$^{-1}$. This behavior is observed with both fluids, whether the fluid is exposed to an increasing or decreasing sequence of shear rates, with no hysteresis.

Samples 12, 13, and 19 are not compositions of this invention because they do not exhibit retro-viscous properties.

EXAMPLE 5

To show that the surfactant of the invention is critical, the following example is presented:

A composition is obtained by mixing 32.8% distilled water, 31.5% dodecyl trimethyl ammonium bromide (the surfactant) and 35.7% chloroform. Pressure drop as ΔP (psi) vs. flow rate, Q (cc/sec) data are obtained as reported in Table X:

TABLE X

TUBE VISCOMETER DATA

| ΔP (psi) | Q (cc/sec) |
|---|---|
| 20.0 | 0.04247 |
| 28.44 | 0.07938 |
| 40.0 | 0.1386 |
| 40.0 | 0.1474 |
| 49.8 | 0.2010 |
| 70.0 | 0.3670 |
| 70.0 | 0.3704 |
| 70.0 | 0.380 |
| 84.0 | 0.5481 |
| 100.0 | 0.700 |
| 100.0 | 0.7010 |
| 100.0 | 0.7580 |

These data are obtained in a tube viscometer having a diameter of 0.0483" and a length of 84". As these data indicate, a substantially large increase in flow rate is not observed at small increases in ΔP.

The above examples are not intended to limit the invention; rather, all equivalents obvious to those skilled in the art are intended to be incorporated within the scope of the invention as defined within the specification and appended claims.

We claim:

1. In a process for using a fluidic fluid for controlling fluid systems, the improvement comprising using as the fluidic fluid, a liquid composition which contains lamellar micelles whose axial ratio is at least 3.5.

2. In a process for using a fluidic fluid for controlling fluid systems, the improvement comprising using as the fluidic fluid a composition comprising about 50.00 to about 54.00% of a liquid hydrocarbon, about 24.80 to about 28.00% water, about 7.00 to about 7.35% of an anionic surfactant having an average equivalent weight of 350 to about 525 or a carboxylate having an average equivalent weight of about 200 to 500, to produce a fluidic fluid having lamellar micelles having axial ratios of at least 3.5 and wherein said fluidic fluid exhibits retro-viscous properties.

3. The process of claim 2 wherein the surfactant is a petroleum sulfonate containing an alkali metal or ammonium cation.

4. The process of claim 2 wherein the fluidic fluid contains cosurfactant.

5. The process of claim 2 wherein the composition contains 0.001 to about 5% by weight of an electrolyte which is an inorganic salt, inorganic base, inorganic acid, or a combination thereof.

6. The process of claim 2 wherein a cosurfactant is present in concentrations of up to about 13.95%, the hydrocarbon is present in concentrations of about 52.40 to 53.80% and the water is present in concentrations of about 25.00 to about 27.00%.

7. The process of claim 2 wherein the axial ratio of the micelles is at least about 10.

8. The process of claim 2 wherein the axial ratio of the micelles is at least about 20.

9. In a process for using a fluidic fluid for controlling fluid systems wherein a fluidic fluid comprised of about 7.00 to about 7.35% of an alkaryl sulfonate having an average equivalent weight within the range of about 350 to about 525, about 50.00 to about 54.00% of a liquid hydrocarbon, about 25.00 to about 27.00% of water, and up to about 13.95% of a cosurfactant to produce a fluidic fluid having lamellar micelles having an axial ratio of at least about 3.5 and wherein said fluidic fluid exhibits retro-viscous properties.

10. The process of claim 9 wherein the composition contains about 0.001 to about 5%, by weight, of an electrolyte which is an inorganic salt, inorganic acid, inorganic base or combination thereof.

11. The process of claim 9 wherein the sulfonate is a petroleum sulfonate having an average equivalent weight within the range of about 375 to 500.

12. The process of claim 9 wherein the hydrocarbon concentration is about 52.40 to about 53.80%.

13. The process of claim 9 wherein the hydrocarbon is a crude oil, partially refined fraction of a crude oil, or a refined fraction of a crude oil.

14. The process of claim 9 wherein the water concentration is about 25.80 to about 26.00%.

* * * * *

UNITED STATES PATENT AND TRADEMARK OFFICE
CERTIFICATE OF CORRECTION

PATENT NO. : 4,221,229
DATED : September 9, 1980
INVENTOR(S) : Karl D. Dreher, William B. Gogarty It is certified that error appears in the above-identified patent and that said Letters Patent are hereby corrected as shown below:

Col. 1, line 37: Delete "and" and insert --tend--.

Col. 2, line 31: Delete "84" and" and insert --84" long and--.
Col. 3, line 62: Delete "about 20 more" and insert $_1$ --about 20 or more--.
Col. 7, line 64: Delete "sec$^{311}$" and insert --sec$^{-1}$--.
Col. 8, line 5: Delete "sec$^{311}$" and insert --sec$^{-1}$--.

*Signed and Sealed this*

*Twenty-eighth* Day of *April 1981*

[SEAL]

Attest:

RENE D. TEGTMEYER

Attesting Officer

Acting Commissioner of Patents and Trademarks